H. W. TRUSCOTT.
TRACTOR.
APPLICATION FILED JAN. 23, 1920.

1,340,306.

Patented May 18, 1920.
2 SHEETS—SHEET 1.

Inventor
H. W. TRUSCOTT.
By Arthur H. Sturges.
Attorney

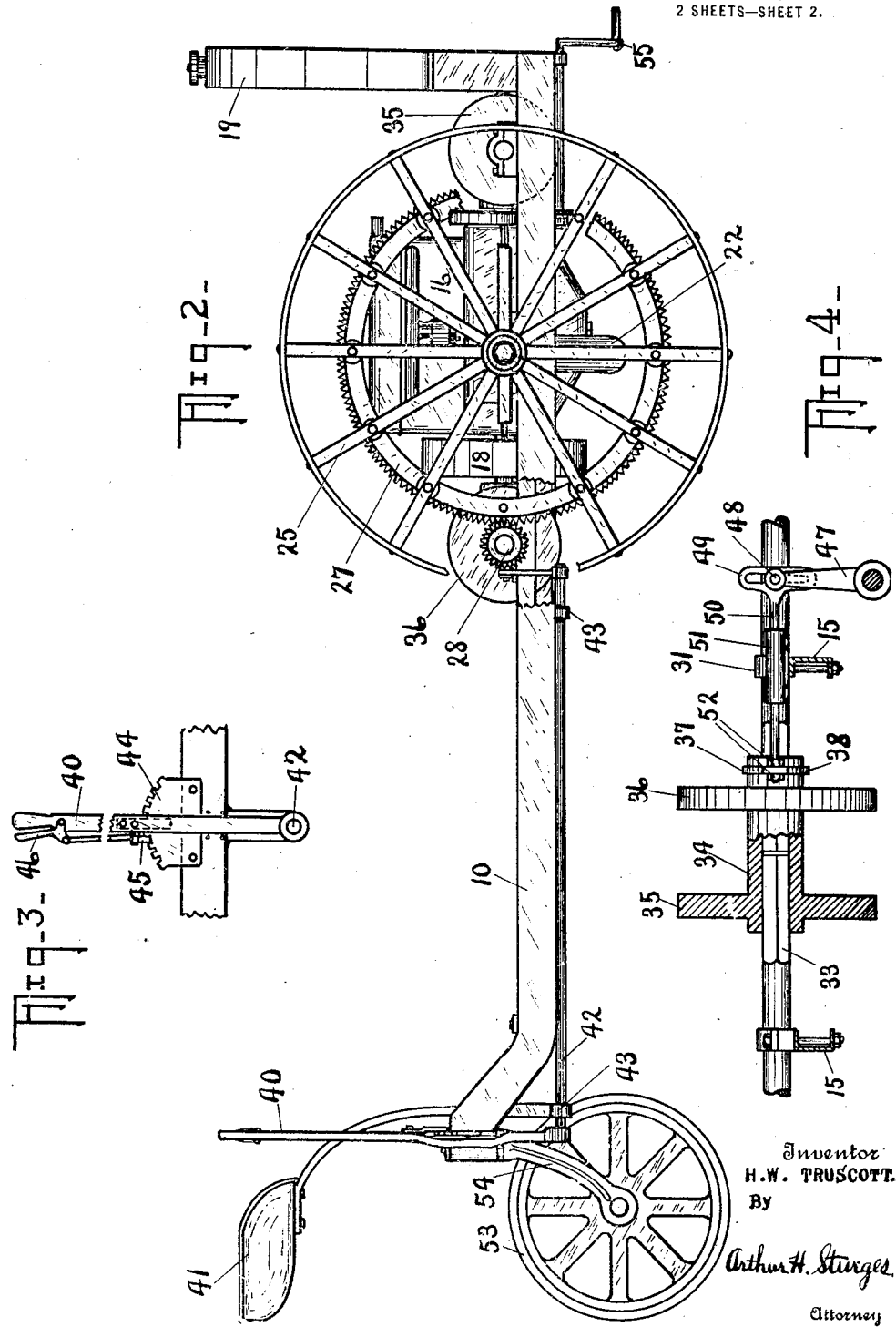

UNITED STATES PATENT OFFICE.

HERBERT W. TRUSCOTT, OF OMAHA, NEBRASKA.

TRACTOR.

1,340,306.     Specification of Letters Patent.     Patented May 18, 1920.

Application filed January 23, 1920. Serial No. 353,593.

*To all whom it may concern:*

Be it known that I, HERBERT W. TRUSCOTT, a citizen of the United States, residing at Omaha, in the county of Douglas and State of Nebraska, have invented certain new and useful Improvements in Tractors, of which the following is a specification.

The present invention relates to tractors, and more particularly to a means for transmitting a controlling power from an engine to the driving wheels for propelling the tractor and for regulating the directions of travel of the tractor.

An object of the present invention is to provide a mechanism of this character which is under easy control of a single operator, from the seat of the operator, and which facilitates the starting and stopping of the tractor and which also permits the guiding of the tractor in its path of movement.

Another object of the invention is to provide a tractor which may be turned in a relatively small space; which is provided with a transmission mechanism adapted for operation at opposite ends of the drive or motor shaft to impart power from the engine to the drive wheels for turning the same simultaneously in opposite directions or in the same direction; and to provide a hand lever control for engaging and disengaging, independently, the transmission connections between the respective drive wheels and the opposite ends of the drive shaft.

A still further object of the invention is to provide a relatively strong and rigid mounting of the traction wheels on the frame and separate relatively strong drive connections arranged independently upon the frame for each drive wheel, the whole structure and assemblage being such as to embody strength and simplicity in construction and number of parts for adapting the tractor structure for large or heavy vehicles.

The above and various other objects and advantages of this invention will in part hereinafter become apparent, and in part be stated, in the following description of the present preferred embodiment, the same being illustrated in the accompanying drawings, wherein:

Fig. 2 is a side elevation of a corner of the frame showing one of the controlling levers mounted thereon, portions of the frame, a driving wheel and its ring gear being broken away.

Fig. 3 is a view of a portion of the frame, with a toothed sector and hand lever mounted thereon, and Fig. 4 is a fragmentary enlarged sectional view taken substantially on the line 4—4 of Fig. 1, showing one of the transmission elements for one of the drive wheels.

Figure 1:
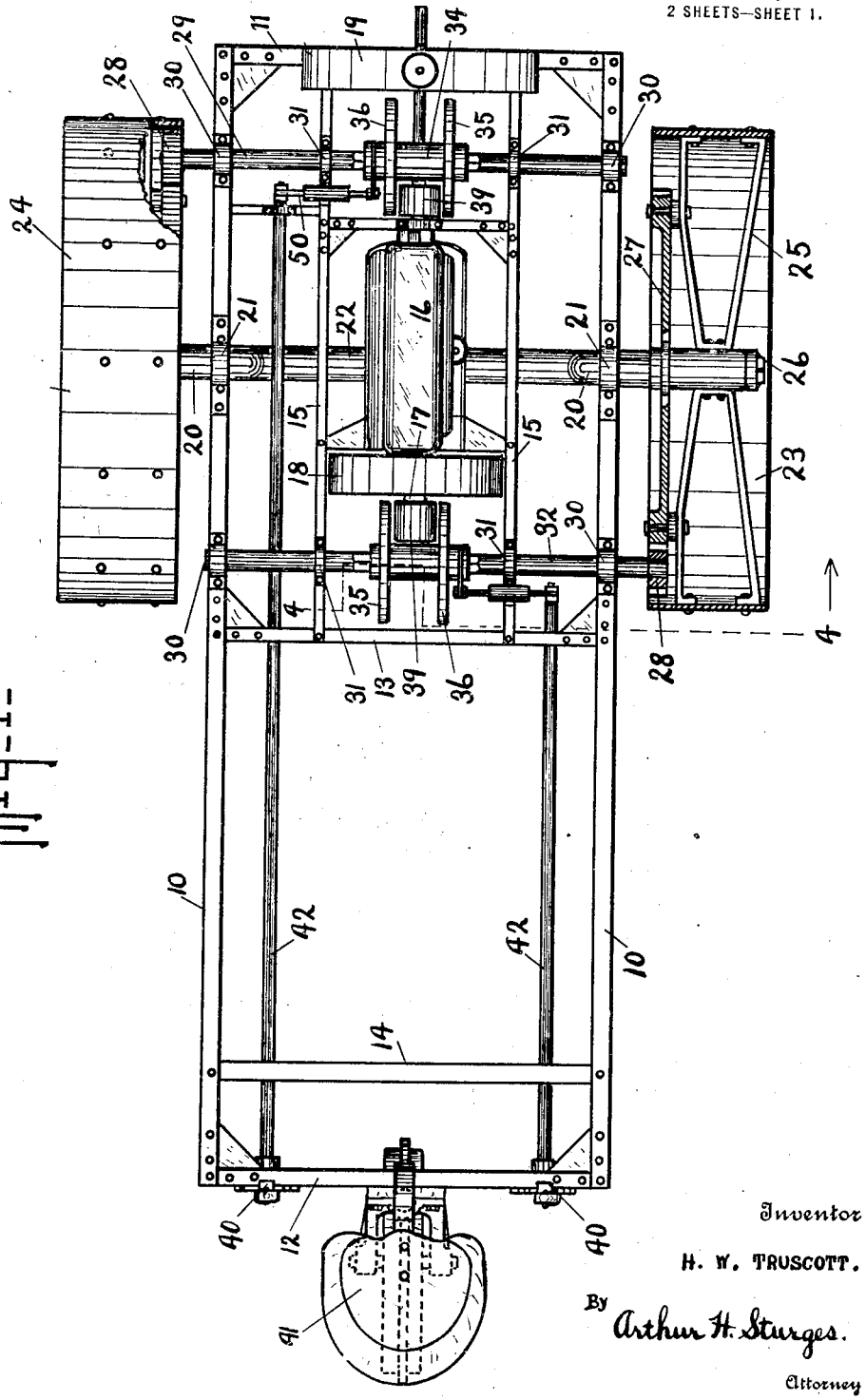
Figure 1 is a top plan view of a tractor constructed according to the present invention and embodying the novel transmission features.

Referring to the drawings by numerals, and wherein like parts are designated by similar numerals of reference throughout the several views, the tractor is provided with a main frame having side bars 10 joined at opposite ends by front and rear crosspieces 11 and 12 and reinforced by suitably spaced-apart transverse braces 13 and 14. The main frame is provided with a secondary frame in its forward end, the same comprising longitudinal bars 15 secured at their forward ends to the cross bar 11 and at their rear ends upon the cross brace 13. The bars 15 are spaced inwardly from the side bars 10 of the main frame and are adapted to support upon the secondary frame an engine 16 of preferably the internal combustion type with its drive shaft 17 extending longitudinally in the secondary frame and supporting a fly wheel 18 at preferably the rear end of the motor. The fuel supply and other adjuncts of the motor 16 are not shown, but may be arranged in any convenient manner upon the frame. A conventional type of radiator 19 is arranged upon the forward cross bar 11 in front of the motor and may of course be connected thereto in any suitable manner.

The main frame is provided at its forward end with an arched axle 20 of the stationary type which is secured by straps 21 or the like to the side bars 10 of the main frame, and which has its arched portion 22 extending downwardly beneath the secondary frame to clear the motor 16 and adjacent parts. Mounted for rotation on each end of the axle 20 is a tractor wheel, the tractor wheels being designated as 23 and 24. These tractor wheels may be of any approved construction, and as shown have their rims mounted on radiating U-shaped spokes 25 supported on a hub 26, the planes of the spokes 25 being coincident with the axis of the wheel and presenting inner and outer spoke arms at the respective sides of the wheel. A ring gear 27 is bolted or otherwise suitably secured against the inner arms of the spokes 25, and the ring gear is of a diameter such as to sufficiently space the teeth of the ring gear from the rim of the wheel 23, to admit free positioning and operation of a pinion 28 meshing with each ring gear. A pinion 28 is thus arranged within the peripheral margin of its tractor wheel 23 and is also arranged within the inner side of the wheel. From Fig. 1 it will be noted that the pinion 28 is arranged within the tractor wheel 23 rearwardly of the arched axle 20, and that the pinion 28 of the tractor wheel 24 is arranged in the latter forwardly of the arched axle 20. The forward pinion 28 is mounted upon a counter shaft 29 which is mounted in bearings 30 and 31 carried upon the side bars 10 and the longitudinal bars 15 respectively of the main and secondary frames. The rear pinion 28 is mounted upon a counter shaft 32 which is similarly mounted in corresponding bearings in the main and secondary frame. The countershafts 29 and 32 each extend entirely across the main and secondary frames and in spaced relation to the forward and rear ends of the motor 16.

As best shown in Fig. 4, each counter shaft, such as the counter shaft 32, is provided with a non-circular portion 33 intermediate its ends and arranged opposite the adjacent end of the drive shaft 17 of the motor. Slidably disposed upon the non-circular portion 33 is a sleeve 34 provided with a pair of spaced apart friction disks 35 and 36, and having on one end an annular exterior groove 37 receiving a fork 38 for shifting the sleeve 34 on the shaft 32. The sleeve 34 is provided with a non-circular axial opening therethrough adapted to fit the portion 33 of the counter shaft for turning the sleeve with the counter shaft, and admitting the shifting of the sleeve lengthwise of the shaft. The disks 35 and 36, as shown in Fig. 1, are disposed at opposite sides of the adjacent end of the drive shaft 17, and the latter is provided with a drive pulley 39 on each end, a drive pulley being arranged between the friction disks of each counter shaft.

For shifting the friction disks to alternately engage the adjacent pulleys 39, hand levers 40 are arranged upon the rear crosspiece 12 of the frame, one hand lever disposed at each side of a seat 41 for the operator. Each hand lever 40 is mounted on a shaft 42 arranged longitudinally in the side of the main frame and supported in bearings 43 depending from the cross piece 12 and the intermediate cross brace 13. The rear cross piece 12 is provided, opposite each hand lever 40, with a toothed sector 44 adapted to receive a locking dog 45 carried upon the lever 40 and operated in the usual manner by a thumb latch 46. The dog 45 is adapted to lock the lever 40 in adjusted position for holding the shaft 42 fixed when turned.

The shafts 42 extend at their forward ends into a position adjacent the respective counter shafts, and carry upstanding arms 47 with pins 48 in their upper ends slidably secured in a vertically slotted T head 49 of a shifting rod 50.

The shifting rod 50 is slidably disposed in a sleeve bearing 51 which is supported upon the adjacent side bar 15 of the secondary frame for holding the shifting rod 50 for horizontal movement. The rods 50 extend inwardly from the arm 47, and are threaded at their inner ends and adapted to engage through apertures in the adjacent forks 38, and are adjustably secured to the adjacent forks by lock nuts 52 threaded on the rods 50 and binding against the opposite sides of the forks.

The rear end of the tractor frame may be supported in any suitable manner, such as by a caster wheel 53 mounted in a pivoted fork 54 depending from the frame so that the tractor may be operated in a forward, backward or circular direction under complete control of the traction wheels 23 and 24. The motor 16 may be started or cranked by a suitable handle 55 supported beneath the forward end of the main frame and connected by a chain 56 or the like to the crank shaft 17.

In operation, when it is desired to propel the tractor in a forward direction, the operator, mounted upon the seat 41, grasps the left hand lever 40 and swings the same outwardly from him to draw the shifting rod 50 outward and slide the forward sleeve 34 to the left so as to bring the friction disk 35 against the drive pulley 39. As the engine turns over from left to right in the usual manner, the friction disk 35 and its counter shaft 29 are turned over rearwardly and such motion is transmitted through the pinion 28 and the ring gear 27 to the traction wheel 24, the latter being driven in a forward direction. At the same time the operator upon the seat 41 swings the right hand lever 40 outwardly to draw the shifting rod 50 to the right and move the rear friction disk 35 against the rear drive pulley 39. This adjustment causes the motor 16 to drive the rear counter shaft 32, turning the latter over rearwardly. This motion is transmitted by pinion 28 and the ring gear 27 to the tractor wheel 23 for driving the same in a forward direction.

It is apparent that when it is desired to turn the tractor to the right or to the left, it is only necessary to manipulate the desired hand lever 40 for releasing either the forward or rear friction disk 35 from its adjacent drive pulley 39, and when a very short turn is desired, one of the hand levers 40 may be drawn inwardly toward the operator for engaging the opposite or reversing disk 36 with the drive pulley. Such adjustment affects the forward driving of one traction wheel and the rearward driving of the other traction wheel so that the tractor may be made to turn substantially on an axis passing through the middle of the frame. Complete control may therefore be had of the movements of the tractor simply by manipulating either one of both of the hand levers 40. When both of the hand levers 40 are shifted into reverse position, both of the disks 36 may be brought into engagement with their respective drive pulleys 39 and the tractor may then be driven backwardly.

The arrangement and construction of the parts is such that a large or small tractor may be constructed by simply increasing the proportions and strength of the parts when a large tractor is required, and the same flexibility of control is had in all instances. It will be noted that the motor is independently connected at opposite ends to the opposite tractor wheels and that thus substantial parts and supports are provided for the counter shafts, and ample provision in space and support is had for the shifting elements and the friction disks.

It is within the scope of this invention to make such changes and modifications in structure and design of the above specifically described embodiment as fall within the scope of the following claims.

1. In tractor, a frame, a traction wheel at each side of the frame, a gear wheel mounted on each traction wheel, front and rear counter shafts mounted transversely in the frame, a pinion on one end of each counter shaft intermeshing with the adjacent gear wheel of the traction wheel with one pinion forward and the other pinion in rear of the axis of rotation of the traction wheels, a motor arranged in the frame between the counter shafts, and independent shiftable connections between the counter shafts and the respective ends of the motor.

2. In a tractor, a frame, independent traction wheels mounted on the forward end and at opposite sides of the frame, a caster wheel supporting the rear end of the frame, a motor arranged longitudinally in a forward end of the frame, a transverse counter shaft mounted on the frame at each end of the motor and having independent connections with the traction wheels, reversible connections between the opposite ends of the motor and the counter shafts, and shifting means for the reversible connections and including independent hand levers and independent connections between the hand levers and the reversible connections for independently driving the traction wheels in a forward direction and in a reverse direction.

In testimony whereof, I have affixed my signature in presence of two witnesses.

HERBERT W. TRUSCOTT.

Witnesses:
ARTHUR H. STURGES,
F. G. TRUSCOTT.